United States Patent Office 3,336,383
Patented Aug. 15, 1967

3,336,383
NITRO-CONTAINING SULFONAMIDE COMPOUNDS
Gustave B. Linden, Short Hills, N.J., and Henry J. Marcus, West Covina, Calif., assignors to Aerojet-General Corporation, Azusa, Calif., a corporation of Ohio
No Drawing. Filed July 8, 1964, Ser. No. 381,231
6 Claims. (Cl. 260—556)

This invention pertains to a novel class of nitro-containing sulfonamide compounds, and to their method of preparation.

Heretofore it has been known that organic sulfonyl halides will react with certain alkylamines to form sulfonamides. However, this reaction has not found general application in the field of nitro chemistry because the amino group on the alkylamine must be sufficiently basic to react with the acidic organic sulfonyl halide reactant. Since nitro groups tend to be strongly electron-withdrawing, the amino group in nitro-containing alkyl amines is not strongly basic, and thus would not be excepted to form sulfonamides.

Quite surprisingly it has now been found that a certain specific class of nitro-containing alkyl amines will react with organic sulfonyl halides to form sulfonamides. This reaction has been found to proceed readily in spite of the presence of the electron-withdrawing nitro groups. It has further been found that the sulfonamide compounds thus produced by the reaction of this invention have many advantageous properties. Specifically, these compounds are useful as bactericides, plasticizers and as chemical intermediates.

It is an object of this invention to prepare a novel class of chemical compounds. It is another object of this invention to prepare chemical compounds by a novel process. It is a further object of this invention to prepare new nitro-containing sulfonamides useful as bactericides. Still another object of this invention is the provision of compounds valuable as chemical intermediates and as plasticizers in high molecular weight polymeric compositions. These and other objects of our invention will be evident from the detailed description which follows.

The novel nitro-containing sulfonamides of this invention have the general formula:

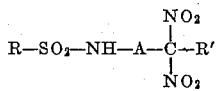

wherein R is a hydrocarbyl radical selected from the group consisting of alkyl, aryl, aralkyl and alkaryl; R' is alkyl and A is an alkylene radical. Preferably R, R' and A are lower members of the series and contain from 1 to about 8 carbon atoms. Typically, R may be phenyl, tolyl, benzyl, methyl, ethyl, propyl, neopentyl, hexyl or octyl; R' may be methyl, ethyl, propyl, butyl, pentyl, hexyl, heptyl or octyl; and A may be methylene, ethylene, propylene, butylene, pentamethylene, hexamethylene, heptamethylene or octamethylene.

The compounds of the above formula are prepared in accordance with the following general reaction equation:

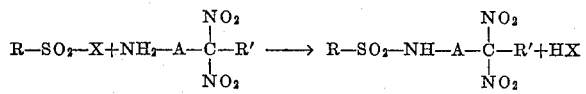

In this equation, R, R' and A are as previously defined; and X is halogen, preferably chlorine or bromine.

As can be seen, the reaction involves the reaction of a dinitroalkylamine with a hydrocarbylsulfonyl halide. It should be understood, however, that the amine reactant may be generated in situ by reaction of a base with the corresponding amine hydrohalide. Thus, for example, in basic medium 3,3-dinitro-1-butylamine hydrochloride yields 3,3-dinitro-1-butylamine. Typical bases which will liberate the free amine are pyridine, sodium hydroxide, potassium hydroxide and lithium hydroxide.

The dinitroalkylamines useful in the above reaction include: 2,2-dinitro-1-propylamine; 3,3-dinitro-1-butylamine; 3,3-dinitro-1-pentylamine; 4,4-dinitro-1-hexylamine; 4,4-dinitro-1-octylamine; 5,5-dinitro-1-decylamine; 3,3-dinitro-5-methyl-1-decylamine; and 6,6-dinitro-1-dodecylamine.

The hydrocarbylsulfonyl halides reactive with the dinitroalkylamines include: benzenesulfonyl chloride; benzenesulfonyl bromide; benzenesulfonyl fluoride; naphthylsulfonyl chloride; toluenesulfonyl chloride; benzylsulfonyl chloride; methylsulfonyl chloride; ethylsulfonyl chloride; ethylsulfonyl bromide; propylsulfonyl chloride; tertiarybutylsulfonyl chloride; octylsulfonyl chloride; and decylsulfonyl chloride.

The above reaction may be carried out in the absence of a solvent, or optionally, a substantially inert reaction solvent such as water or the lower alkanols, i.e., methanol, ethanol, etc. may be utilized.

In this reaction, the reaction temperature and pressure are not critical. Usually the reaction is carried out at a temperature of from about 20° C. to about 150° C. and at a pressure of from 0.1 to about 100 atmospheres. The upper limit on the reaction temperature is set by the decomposition temperature of the dinitroalkylamine reactant.

The proportions of reactants employed are normally about stoichiometric up to a slight stoichiometric excess of the sulfonyl halide. While these proportions do give superior yields, satisfactory results are achieved when other proportions are employed.

Preferably, although not necessarily, the reaction is conducted in the presence of a basic media such as pyridine, or dilute sodium hydroxide. This procedure is particularly efficacious where the amine reactant is supplied in the form of hydrohalide salt.

The novel nitro-containing sulfonamides are isolated and purified by conventional procedures known to those skilled in the art. Thus, this result is normally accomplished by extraction, filtration, evaporation, distillation and/or scrubbing.

The following examples are presented solely for the purpose of illustration and should not be regarded as limiting the scope of the invention in any way. In the examples, the parts and percentages are by weight unless otherwise indicated.

EXAMPLE I

*Preparation of benzenesulfonamide of 3,3-dinitro-1-butylamine*

The 3,3-dinitro-1-butylamine hydrochloride (5.0 grams, 0.025 M) was dissolved in 40 ml. pyridine. Then 4.6 grams (0.0263 M) of benzenesulfonyl chloride was added. The mixture turned yellow with slight warming. After refluxing two hours, the yellow color disappeared gradually. The mixture was cooled and poured into water with stirring. The nearly-colorless solid was recovered by filtering, and washed well with water. The wet product was dissolved in 75 ml. methanol and 20 ml. water, charcoaled and chilled. The product was filtered off. The product was washed with 50 percent aqueous methanol, then with water, later with dilute hydrochloric acid, and finally with much water. The produce, slightly wet, weighed 7.9 grams, M.P. 98 to 103° C. The product was dissolved in 50 ml. slightly warm methanol, filtered by gravity from some fibrous material, heated to boiling, added to 50 ml. hot water. The product was recovered by filtering, washed with 50 percent aqueous methanol, and dried in desiccator.

Weight 5.1 grams (67 percent of theoretical yield) M.P. 101.5 to 102.5° C.

*Analysis.*—Calc'd: C, 39.60; H, 4.32; N, 13.86; S, 10.57. Found: C, 39.22; H, 4.34; N, 14.46; S, 10.28.

EXAMPLE II

*Preparation of p-toluenesulfonamide of 3,3-dinitro-1-butylamine*

The 3,3-dinitro-1-butylamine hydrochloride (2.0 grams, 0.010 M) was partly dissolved in 15 ml. pyridine. Then 1.9 grams (0.01 M) of p-toluenesulfonyl chloride was added. The mixture became yellow, and warmed slightly. The mixture was refluxed one hour, cooled, poured into water, and filtered. A white solid product was recovered, and washed well with water, M.P. 105 to 108° C., wt. 1.5 grams.

EXAMPLE III

*Preparation of benzenesulfonamide of 3,3-dinitro-1-hexylamine*

The 3,3-dinitro-1-hexyl amine hydrochloride (0.025 M) is dissolved in 40 ml. pyridine. Then benzenesulfonyl bromide (0.025 M) is added. The mixture is refluxed for about two hours, cooled, and poured into water with stirring. The filtered solid is washed well with water. The product is dissolved in hot methanol (about 75 ml.) and water (20 ml.), charcoaled and chilled. The product is recovered by filtration. The product is washed with 50 percent aqueous methanol, then with water, later with dilute hydrochloric acid, and finally with much water. The product is dissolved in 50 ml. slightly warm methanol, filtered, heated to boiling, and then 50 ml. hot water is added. The liquid is chilled, and the product is filtered off, washed with 50 percent aqueous methanol and dried. The product is a good yield of the benzenesulfonamide of 3,3-dinitro-1-hexylamine.

EXAMPLE IV

*Preparation of ethylsulfonamide of 3,3-dinitro-1-butylamine*

The 3,3-dinitro-1-butylamine (0.010 M) is partly dissolved in about 15 ml. pyridine. There is then added 0.001 M ethylsulfonyl chloride. The mixture is refluxed one hour, then cooled and poured into water. Filtering yields a product which is substantially pure ethylsulfonamide of 3,3-dinitro-1-butylamine.

EXAMPLE V

*Preparation of benzylsulfonamide of 3,3-dinitro-1-butylamine*

The amine hydrochloride (0.025 M) is dissolved in pyridine. There is added benzylsulfonyl chloride (0.026 M). The mixture is refluxed about two hours, cooled and poured into much water with stirring. The filtered solid is washed well with water, and dissolved in 75 ml. of hot methanol. After chilling, the product is recovered by filtration. The product is then washed with 50 percent aqueous methanol, then with water, later with dilute hydrochloric acid, and finally with much water. The product is then dissolved in 50 ml. of slightly warm methanol, filtered, heated to boiling, and 50 ml. hot water is added. This liquid is chilled, and the product filtered off. The product is finally washed with 50 percent aqueous methanol and dried. The product thus obtained represents a good yield of benzylsulfonamide of 3,3-dinitro-1-butylamine.

By the procedures already described, other novel nitro-containing sulfonamides can be prepared. For example, 4,4-dinitro-1-octylamine may be reacted with isopropyl sulfonyl chloride to yield the isopropylsulfonamide of 4,4-dinitro-1-octylamine; and 4,4-dinitro-2,6-dimethyl-1-decylamine may be reacted with naphthylsulfonyl chloride to provide the naphthylsulfonamide of 4,4-dinitro-2,6-dimethyl-1-decylamine.

The novel sulfonamides of this invention are useful as bactericides. These compounds may also be used to plasticize high molecular weight, organic, polymeric materials such as the polyurethanes. When used for this purpose the sulfonamides may be incorporated by preparing the polymer in the presence of the plasticizer, or alternatively, the plasticizer may be blended with the finished polymer.

Having fully described the invention, it is intended that it be limited only by the lawful scope of the appended claims.

We claim:
1. A novel compound of the formula:

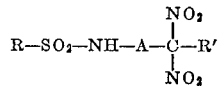

wherein R is selected from the group consisting of lower aryl, lower alkyl, lower aralkyl and lower alkaryl, R' is lower alkyl and A is lower alkylene.

2. The benzenesulfonamide of 1,1-dinitro-1-butyl-amine.
3. The p-toluenesulfonamide of 3,3-dinitro-1-butyl-amine.
4. The benzenesulfonamide of 3,3-dinitro-1-hexyl-amine.
5. The ethylsulfonamide of 3,3-dinitro-1-butylamine.
6. The benzylsulfonamide of 3,3-dinitro-1-butylamine.

References Cited

UNITED STATES PATENTS

| | | | |
|---|---|---|---|
| 2,366,494 | 1/1941 | D'Alelio | 260—556 |
| 2,520,917 | 3/1945 | Dickey et al. | 260—556 |
| 2,757,156 | 7/1956 | Dazzi | 260—556 |

WALTER A. MODANCE, *Primary Examiner.*

HARRY I. MOATZ, *Assistant Examiner.*